United States Patent

[11] 3,573,653

[72] Inventor Vern N. Smiley
    San Diego, Calif.
[21] Appl. No. 842,915
[22] Filed July 18, 1969
[45] Patented Apr. 6, 1971
[73] Assignee The United States of America as represented by the Secretary of the Navy

[54] CONTINUOUSLY TUNABLE THIN FILM LASER EMPLOYING THE ELECTRIC FIELD EFFECT
7 Claims, 2 Drawing Figs.

[52] U.S. Cl. .................................................. 331/94.5, 350/160
[51] Int. Cl. .................................................. H01s 3/10
[50] Field of Search .................................................. 331/94.5; 350/160

[56] References Cited
UNITED STATES PATENTS
3,271,578 9/1966 Bockemuehl ................. 350/160
3,295,911 1/1967 Ashkin et al. ................. 350/150
3,431,512 3/1969 Redfield ..................... 331/94.5

OTHER REFERENCES
French: "Franz-Keldysh Effect Light Modulation From Bulk Semi-Insulating GaAs," IEEE Journal of Quantum Electronics, vol. QE-4, pp 365— 6, May, 1968
Johnson et al.: "Optically Pumped Thin-Platlet Semiconductor Lasers," Journal of Applied Physics, vol. 39, pp 3977— 85, July, 1968
Stillman et al.: " Volume Excitation of an Ultrathin Single-Mode CdSe Laser," Applied Physics Letters, vol. 9, pp 268— 9, October, 1966

*Primary Examiner*—Ronald L. Wibert
*Assistant Examiner*—Edward S. Bauer
*Attorneys*—Joseph C. Warfield, Jr., George J. Rubens and John W. McLaren

ABSTRACT: A selectively tunable thin film laser comprises a source of excitation energy and a thin film of laser material positioned to intercept the excitation energy. Conductive means are positioned on either side of the laser material and insulated therefrom; a source of selectively variable electrical potential is connected to the conductive means to generate a variable electric field therebetween so as to tunably change the wavelength of the laser output.

INVENTOR.
VERN N. SMILEY

CONTINUOUSLY TUNABLE THIN FILM LASER EMPLOYING THE ELECTRIC FIELD EFFECT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Known prior art methods of tuning lasers have employed a variable magnetic field, variable temperature, or some method of changing the physical cavity size to effect a change in the wavelength of the laser output energy. Most of these known prior art techniques and methods have been applied to dielectric crystal or to gas lasers, both of which are of relatively large dimensions of the order of several centimeters or more in thickness. Relatively very little known success has been accomplished in tuning thin semiconductor laser materials. Moreover, most of the known thin semiconductor laser techniques and methods produced a beam of laser output energy parallel to the plane of the thin film of laser material resulting in generally poor beam properties and limited laser beam aperture size.

BRIEF DESCRIPTION OF THE INVENTION

In its simplest form the present invention may comprise a thin film or thin slab of semiconductor material in single crystal or polycrystaline form disposed between two thin transparent windows of dielectric material which act as insulators. On the outside of the dielectric or insulating material, a conductive means such as a coating or film of conducting material of semitransparent character is connected to a source of selectively variable electrical potential. Alternatively, a film of liquid capable of exhibiting desireable lasing action may be used in place of solid laser material.

This arrangement functions on the principle of the change of index of refraction produced along with a change in absorption coefficient resulting from the application of an electric field to a semiconductor or dielectric lasing material. This effect occurs near an absorption edge and the change in absorption coefficient is referred to as the Franz-Keldysh effect. A Fabry-Perot optical cavity is formed by the laser material and the two semitransparent or partially transmitting conductive films. A change in the index of refraction due to the change in the electric field produced between the two conductive materials brings about a change in the effective optical thickness of the film, and as a consequence changes the resonant frequency of the optical cavity. This arrangement will then oscillate as a laser, producing an output determinable from the parameters of its operation and is rendered continuously tunable by varying the electric field strength. The laser beam output emerges in a direction perpendicular to the plane of the laser material and its associated films or coatings. Accordingly, a significantly greater beam aperture is realized, obviating many of the disadvantages of prior art arrangements wherein the laser beam emerged from the laser material in a direction parallel to its principal axis.

Accordingly, it is a primary object of the present invention to provide a continuously tunable thin film laser wherein the wavelength of laser energy output may be determined from the strength of an electric field generated across the laser material.

Another most important object of the present invention is to provide such a thin film laser wherein the effective optical size of the laser cavity may be changed under the control of an electric field.

Yet another most important object of the present invention is to provide such a thin film laser wherein the effective optical length of the laser cavity is such that only single mode lasing action is generated.

A further most important object of the present invention is to provide a continuously tunable thin film laser which is significantly smaller in size than known prior art tunable lasers.

A further object of the present invention is to provide a continuously tunable thin film laser in which the laser energy output emerges in a direction perpendicular to the principal plane of the laser material.

An ancillary object of the present invention is to provide a continuously tunable thin film laser which has improved beam qualities and beam aperture characteristics.

These and other objects, advantages and features of the present invention will be better appreciated from an understanding of the operation of a preferred embodiment as described hereinafter and illustrated in the accompanying drawings.

DESCRIPTION OF THE PREFERRED EMBODIMENT

Figure 1:
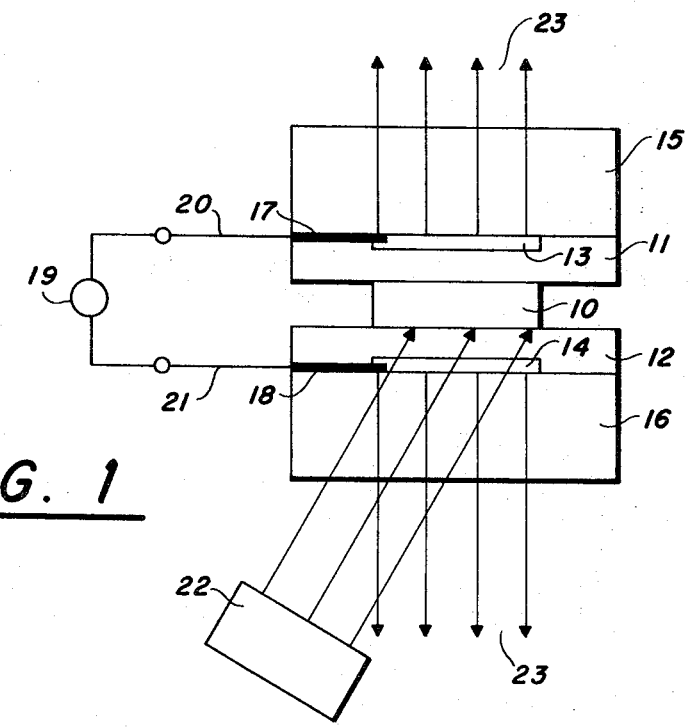
FIG. 1 is a partially cross-sectional schematic representation of a preferred embodiment of the present invention.

FIG. 1 illustrates a preferred embodiment of the present invention. A thin film of laser material 10 is disposed between two transparent windows 11 and 12. The thin film of semiconductor laser material 10 may be in a single crystal or polycrystalline form or comprise a suitable liquid capable of lasing action. The two transparent windows 11 and 12 are of dielectric insulating material as well as being transparent to the transmission of laser excitation energy and laser emission energy. Thin films of conductive material 13 and 14 are disposed on the dielectric nonconductive transparent films of material 11 and 12, respectively, on the sides away from the thin film of laser material 10. These combinations of coatings or successive thin films may each be supported on an appropriate substrate base such as those shown at 15 and 16. Such substrate or base material as employed at 15 and 16 in the illustration of FIG. 1 should have good transmission properties relative to the source of energy which is employed to excite the thin film of laser material 10 to a lasing level, as well as having good transmission properties for the wavelength of laser output energy.

Electrical conductors 17 and 18 are disposed in electrical connection to the films of transparent conductive material 13 and 14, respectively, to provide electrical paths to the outside of the assembly. A source of electrical potential 19, which is preferably selectively variable is connected through appropriate electrical leads 20 and 21 to the conductors 17 and 18, respectively, so that an electrical potential may be impressed upon the two semitransparent conductive films 13 and 14 to create an electric field thereacross.

A source of excitation energy 22 is disposed so that its output impinges upon the assembly previously described, including the thin film of laser material 10. The excitation energy emanating from the excitation source 22 is absorbed in the laser material 10, raising it to a lasing level, whence a beam of laser radiation 23 is generated as an output of the assembly. Preferably, the source of excitation energy 22 is an optical means and may comprise an appropriate noncoherent light source such as a gas discharge device or alternatively a source of coherent excitation energy such as another laser. An optical excitation source of energy is usually of shorter wavelength than the wavelength of the laser energy output. Accordingly, the conductive films 13 and 14, as well as the dielectric nonconductive insulating films 11 and 12 and the substrate base 16, must transmit sufficient shorter wavelength excitation energy to produce the desired laser action.

The embodiment illustrated in FIG. 1 operates on the principle of a change of index of refraction which is produced along with a concomitant change in absorption coefficient resulting from the application of an electric field to a semiconductor or dielectric lasing material. This effect occurs near an absorption edge and, in reference to the change in absorption coefficient, is customarily referred to as the Franz-Keldysh effect.

A change in the index of refraction brings about a change in the effective optical thickness of the film of laser material and hence changes the resonant frequency of the Fabry-Perot optical cavity formed by the two partially transmitting, conductive films such as those shown at 13 and 14 in the illustration of the preferred embodiment in FIG. 1, which possess a sufficient degree of reflectance at the wavelength of emitted laser energy, while allowing an acceptable amount of excitation energy to reach the laser material. A change in wavelength $\delta\lambda$ produced by a change in index of refraction $\delta n_1$ may be expressed as $$\delta\lambda = \frac{\delta n_1 \cdot d_1 \cdot \lambda_0}{(n_1 d_1 + 2n_2 l)} \quad (1)$$

where $n_1$ is the index of refraction of the laser material, $d_1$ is the thickness of the laser film, $\lambda_0$ is the central wavelength of its operation, $n_2$ is the index of refraction for the two dielectric insulating films, and $l$ is the thickness of each dielectric film.

An electric field strength of $2 \times 10^5$ V/cm produces an index change of $-0.02$ in GaAs as has been reported by B. O. Seraphin and N. Bottka in Applied Physics Letters 6, 134 (1965). This change in index of refraction $\delta n$ produces a wavelength shift of a resonant cavity containing a thin film of GaAs by about 50 Angstrom units. The device will then oscillate as a laser at a wavelength determined by equation (1) and can be continuously tuned by varying the electric field strength. The electric field strength is produced by applying a variable voltage source such as that shown at 19 in FIG. 1 to conductive leads 17 and 18 which are electrically connected to form a path to the conducting films 13 and 14. The laser output energy emerges in a beam perpendicular to the plane of the thin film of laser material as shown in FIG. 1.

The insulating dielectric films 11 and 12 should be thin as possible. If a semiconductor film is employed as the laser material in a very thin configuration, the insulating material 11 and 12 should also be very thin deposited dielectrics such as $MgF_2$, $L_iF$, SiO, or other suitable materials. If a thicker semiconductor film of laser material is employed and disposed generally as shown at 10 in FIG. 1, mica or a similar relatively thicker insulating sheet of material may be used.

Additionally, in the embodiment of FIG. 1 appropriate antireflective coatings may be applied between the laser material 10 and the insulating materials 11 and 12 to reduce loss of efficiency due to surface reflection at those two interfaces.

The concept of the present invention contemplates that essentially single mode operation will be employed. This requirement necessitates that the optical thickness of the cavity be less than a certain value which may be expressed as $$(n_1 d + 2n_2 l) < \frac{\lambda_0^2}{2\Delta\lambda} \quad (2)$$

where the expression on the left side of equation (2) is the total cavity optical thickness, and $\Delta\lambda$ is the emission bandwidth of the laser material employed.

Additionally, the concept of the present invention contemplates that a device arranged and disposed generally as illustrated in FIG. 1 may be employed as a tunable amplifier or a tunable filter by causing it to operate below oscillation threshold and applying an appropriate input signal.

As an alternative to the illustrated construction or arrangement, one of the substrate materials, preferably the top substrate shown at 15, may be eliminated so that the conductive dielectric and laser material films are deposited directly in the appropriate disposition as taught by the concept of the present invention.

Figure 2:
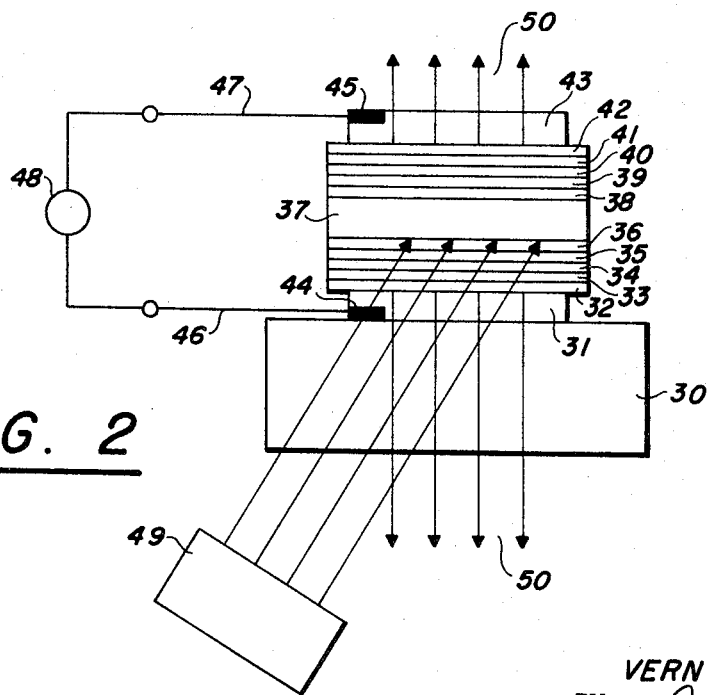
FIG. 2 is a partially cross-sectional schematic representation of a variant embodiment of the present invention.

FIG. 2 illustrates a variant embodiment of the present invention in which multiple layers are supported on a single substrate 30. A partially transparent film 31 of conductive material is deposited directly on the substrate base 30. Multiple layers of dielectric material 32, 33, 34, 35, and 36 are deposited over the film of conductive material 31 and provide electrical insulation between the conductive film 31 and the thin film of laser material 37.

The multiple layers of dielectric material 32, 33, 34, 35 and 36 serve another most important purpose in addition to their insulating function. The layers 32, 33, 34, 35, and 36 are selected to be of alternate high and low index of refraction dielectric materials such $MgF_2$ and ZnS and each layer has a thickness substantially equal to one-quarter wavelength of the emitted laser material. Accordingly, the multiple layers 32, 33, 34, 35, and 36 function in the composite as a high reflectance medium relative to the emitted laser energy, as well as providing suitable insulation between the conductive film 31 and the laser material 37.

A second group of multiple dielectric layers 38, 39, 40, 41, and 42 is deposited upon the thin layer of laser material 37. The layers 38, 39, 40, 41 and 42 are characterized by the same alternate high and low indices of refraction and quarter wavelength thicknesses as the previously described layers 32, 33, 34, 35, and 36.

A conductive film 43 is deposited over the multiple layers 38, 39, 40, 41 and 42 and conductors 44 and 45 are provided to make electrical contact with the conductive films 31 and 43, respectively. The conductive films 31 and 43 are preferably recessed from the edges as illustrated to provide adequate insulation effect. Suitable electrical leads 46 and 47 connect the conductors 44 and 45, and their respectively associated conductive films 31 and 43, to a source of selectively variable electrical potential 48.

In operation, a source of appropriate excitation energy 49 is directed at the assembly as illustrated in FIG. 2, raising the laser material to a lasing level and generating laser output beams as shown at 50, both of which emerge perpendicular to the principal plane of the thin film of laser material 37. Upon selective change of the electrical potential 48 applied to the two conductive films 31 and 43, a commensurate change results in the electric field between the conductive films. The change in electric field causes a consequent change in the effective optical thickness of the laser material and a consistent change in the wavelength of the energy emitted by the laser material.

It will be appreciated by those skilled and knowledgeable in the art that the concept of the present invention provides a laser which offers markedly improved facility of tunability and is capable of producing a wider range of wavelengths of output laser energy than was heretofore known to be possible. Moreover, the laser of the present invention produces a laser output beam which emanates in a direction perpendicular to the plane of thin film of laser material, obviating several of the disadvantages of poor beam properties and limited aperture size which were inherent in some prior art laser arrangements.

An additional highly desirable advantage of the present invention which is inherent in its concept, is that is provides a laser with many desirable characteristics and inherently is of smaller size and more compact in its arrangement than many prior art lasers.

In the described preferred embodiment employed for purposes of illustration and explanation it should be appreciated that the illustrations of FIGS. 1 and 2 are not drawn to scale in the interests of simplicity and clarity in understanding their operation. Those skilled and knowledgeable in the art will appreciate that the extremely thin films and coatings referred to in the foregoing explanations are of the order of a relatively few wavelengths of the energy involved and that the proportions shown in the illustrated embodiments are not intended to be scalar representations.

Moreover, the laser material may comprise a thin film of solid material or a suitable thin film of liquid lasing material.

Obviously many modifications and variations of the present invention are possible in the light of the above teachings. It is therefore to be understood that within the scope of the appended claims the invention may be practiced otherwise than as specifically described.

I claim:
1. A tunable thin film laser comprising: an external source of excitation energy for pumping said laser;
   a thin film of laser material positioned in the path of said excitation energy having a thickness $d$ and an index of refraction $n_1$
   parallel thin films of dielectric material having a thickness $1$ and an index of refraction $n_2$ positioned on opposite sides of said laser material;
   a semitransparent conductive film positioned on the outside of each said film of dielectric material to form an optical cavity having a thickness $(n_1 d + 2n_2 1)$ which is no greater than $\lambda_0^2/2\Delta\lambda$ where $\lambda_0$ is the central wavelength of the laser operation and $\Delta\lambda$ is the emission bandwidth of the laser material
   a source of selectively variable electrical potential; and
   means connecting said source of electrical potential across said conductive films for generating a variable electric field therebetween to vary the index of refraction near the absorption edge of said laser material, whereby to tunably change the laser output wavelength.
2. A tunable thin film laser as claimed in claim 1 wherein said thin film of laser material is a semiconductor.
3. A tunable thin film laser as claimed in claim 1 wherein said excitation energy is a source of optical radiant energy.
4. A tunable thin film laser as claimed in claim 1 wherein said conductive and dielectric films transmit a substantial portion of said excitation energy.
5. A tunable thin film laser as claimed in claim 1 wherein the effective optical thickness of the cavity formed by said film of laser material and its covering films is such that only single mode lasing action is generated.
6 A tunable thin film laser as claimed in claim 1 adapted to accept an input signal as a tunable amplifier by operating below its oscillation threshold.
7. A tunable thin film laser as claimed in claim 6 wherein said input signal comprises optical energy within the wavelength region of the laser energy output of said thin film of laser material.